UNITED STATES PATENT OFFICE.

CHARLES S. ASH, OF SAN FRANCISCO, CALIFORNIA, ASSIGNOR, BY DIRECT AND MESNE ASSIGNMENTS, TO GOULD & ASH, OF SAN FRANCISCO, CALIFORNIA, A PARTNERSHIP COMPOSED OF RALPH A. GOULD AND CHARLES S. ASH.

PROCESS OF TREATING BEER.

1,234,255.     Specification of Letters Patent.    Patented July 24, 1917.

No Drawing.     Application filed February 4, 1916. Serial No. 76,203.

*To all whom it may concern:*

Be it known that I, CHARLES S. ASH, a citizen of the United States, residing at the city and county of San Francisco and State of California, have invented new and useful Improvements in Processes of Treating Beer, of which the following is a specification.

This invention relates to a process of treating beer; and has for its object to stabilize beer by eliminating the causes of cloudiness and turbidity therein, and also to prevent the development of color and the development of a "cooked taste" in the beer following pasteurization.

In the brewing and finishing of beer the aim of the brewer is to obtain a product which is brilliantly clear and transparent and which will so remain under all conditions of subsequent handling.

Beer is rendered turbid or cloudy on standing, particularly in the cold, by reason of the precipitation of nitrogenous bodies. In the process of mashing the grains and making the wort, which is subsequently fermented, a portion of the nitrogenous bodies of the grain is brought into solution. After the fermentation and the aging or "lagering" to which the new beer is subjected some of these nitrogenous bodies are precipitated and are removed by filtration. After the final filtration the beer is brilliant, but upon storage in the case of keg beer, and upon pasteurization and storage in the case of bottled beer, the beer gradually becomes cloudy and finally turbid.

There are two ways in which this cloudiness and turbidity can be prevented; first, by the absolute removal of the nitrogenous bodies still held in the lagered beer, which are susceptible to subsequent precipitation through storage or heating or cooling; and, second, by treating the lagered beer in such a manner that these nitrogenous bodies remain in solution. The first method has never been hitherto successfully accomplished. The second method has yielded results of more or less value and is accomplished by adding to the beer substances known as enzyms, which have the power of rendering these insoluble nitrogenous bodies soluble and hence the beer remains brilliant. Various patents have been issued in this country and abroad which cover the addition of enzyms to beer to prevent its clouding on chilling. The process is known as "chill proofing" or "stabilizing."

Through extensive laboratory experimentation and long study of actual brewery conditions of production, I have perfected a method whereby these objectionable nitrogenous bodies are removed from the lagered beer, thereby making it impossible for the finished beer to become cloudy or turbid from this cause under any conditions of handling, whether it is keg beer or bottled beer.

In the production of bottled beer great difficulty is experienced in preventing a cooked or "pasteurized" taste being imparted to the beer and in preventing the darkening of the color of the beer. Lagered beer contains substances which are food for the various micro-organisms of fermentation and decomposition. The lagered beer contains live micro-organisms of fermentation, consequently it is necessary, when beer is to be bottled, to pasteurize the beer in order to render these organisms inert. The heat which is required to render these organisms inert is sufficient to impart a more or less pronounced cooked taste to the beer in the bottle which progressively increases by storage. Another result of the pasteurization of bottled beer is the development of color in the beer, which phenomenon also increases progressively by storage. These conditions are very undesirable and all bottlers of beer are more or less troubled with them.

Chill-proofing as now practised does not prevent the change in color or the acquisition of a cooked taste in bottled beer.

By my process of eliminating the nitrogenous bodies, which cause cloudiness and turbidity, I prevent at the same time the development of a cooked taste and a darkening of the color in beer that is pasteurized, so that bottled beer is delivered from the bottle with as fresh and aromatic a taste and aroma and as light a color as beer drawn from the keg.

Specifically my process consists in adding to the wort or to the fermented beer at any time before it is filtered for bottling or packaging in kegs sufficient of a mixture of tannic acid, or any of its salts, and sulfurous acid gas or any salt of sulfurous acid, to produce the desired result.

The action of this mixture is both physical and chemical in character. The tannic acid combines with the slightly soluble nitrogenous bodies producing an insoluble compound which precipitates and in the course of its fall acts as a clarifying agent by carrying with it any suspended solids which are present. The subsequent filtering to which the beer is subjected is bettered because of this collected tannic acid coagulum which acts as a filter mass. The sulphurous acid, or its salts, which is added with the tannic acid, serves a double purpose. It accelerates the chemical activity of the tannic acid and by its peculiar properties prevents the subsequent breaking down of the slightly stable compounds which are present in the beer, the breaking down of which imparts a darker color and the cooked or pasteurized taste to bottled beer.

In the practice of my process I can proceed at any stage of the brewing process after the mash has been transferred to the wort kettle. I prefer, however, to institute the necessary manipulations at the time the beer is krausened or carbonated. This manipulation consists in adding to the krausened beer 35 to 60 milligrams per liter of tannic acid or its equivalent in the form of a salt of tannic acid, and 25 to 50 milligrams per liter of sulfurous acid gas or its equivalent in the form of a salt of sulfurous acid; then agitating the mixture thoroughly and allowing it to stand until the desired chemical and physical action has taken place, which, in practice, is about ten days. The chemical action which takes place produces a precipitate of the slightly soluble nitrogenous bodies which would be precipitated by any subsequent cooling or heating to which the beer might be subjected. These precipitated nitrogenous bodies are deposited on the bottom of the tank in which the beer is held and are subsequently removed by filtration when the beer is sent to the filling rooms either to be put in kegs or bottles. My process, therefore, removes the nitrogenous bodies which give the trouble rather than treat them so they will remain in solution as present chill-proofing processes do.

To practise my process when the beer is in the wort kettle it is only necessary to add slightly larger amounts of the two materials named to the contents of the wort kettle; cool the wort as usual and allow it to stand for a sufficient length of time so as to permit the clarification of the wort being accomplished; then filter or decant the clarified wort; innoculate with yeast and continue the brewing process as is usually practised.

To practise my process on carbonated beer the two materials are added to the Ruh beer. The beer is agitated and allowed to stand for a sufficient length of time to permit the clarification of the beer, which, in practice, is about ten days. The beer is then carbonated and filtered.

With my process it is unnecessary to take any additional steps to accomplish perfect chill-proofing, or to prevent the acquisition of a cooked or pasteurized taste, or to prevent the development of color in beer that is to be pasteurized. The treatment given for stabilizing accomplishes all three purposes. If, however, it is desired only to chill-proof beer which is to be used as keg beer, it is only necessary to add the specified amount of tannic acid, or its equivalent in the form of a salt of tannic acid, to the wort, to the Ruh beer, or to the krausened beer. In practice it is found that the addition of even very small quantities of sulfurous acid or its equivalent in the form of a salt of sulfurous acid, causes the tannic acid or its salts to act more vigorously toward the stabilizing of the beer.

The beer produced in the above manner does not become discolored when pasteurized, and is so free from nitrogenous matter that the bottled beer frozen solid and subsequently thawed out remains brilliant, retains its original color for a long period of time and does not acquire a cooked or pasteurized taste.

Having thus described my invention, what I claim and desire to secure by Letters Patent is—

1. A process of stabilizing beer which consists in treating the wort or the fermented beer with a mixture of tannin or any of its salts and sulfurous acid or any of its salts, and removing the resulting precipitate.

2. A process of stabilizing beer which consists in treating the krausened beer with about 35 to 60 milligrams per liter of tannin and about 25 to 50 milligrams per liter of sulfurous acid to prevent the beer from acquiring a cooked taste and from becoming discolored after it is pasteurized.

In testimony whereof I have hereunto set my hand in the presence of two subscribing witnesses.

CHARLES S. ASH.

Witnesses:
 BEN. J. MITZENHEIM,
 W. S. FOLGER.